(12) United States Patent
Crouzet et al.

(10) Patent No.: US 11,781,571 B2
(45) Date of Patent: Oct. 10, 2023

(54) CONTROL UNIT FOR THE PNEUMATIC ACTUATION OF AN ACTIVE CREEL

(71) Applicant: Saurer Technologies GmbH & Co. KG, Krefeld (DE)

(72) Inventors: Alain Crouzet, Guilherand Granges (FR); Mark Dellen, Kempen (DE); Michael Deitlaff, Krefeld (DE)

(73) Assignee: Saurer Technologies Gmbh & Co. KG, Krefeld (DE)

( * ) Notice: Subject to any disclaimer, the term of this patent is extended or adjusted under 35 U.S.C. 154(b) by 0 days.

(21) Appl. No.: 16/793,585

(22) Filed: Feb. 18, 2020

(65) Prior Publication Data
US 2020/0263711 A1    Aug. 20, 2020

(30) Foreign Application Priority Data
Feb. 20, 2019   (DE) .................... 10 2019 104 283.6

(51) Int. Cl.
F15B 15/14    (2006.01)
(52) U.S. Cl.
CPC .............................. *F15B 15/1476* (2013.01)
(58) Field of Classification Search
CPC ...... F15B 15/1476; B65H 19/12; B65H 49/16
See application file for complete search history.

(56) References Cited

U.S. PATENT DOCUMENTS

| 2,159,879 A | 5/1939 | Dewandre |
| 4,029,829 A | 6/1977 | Weaver et al. |

(Continued)

FOREIGN PATENT DOCUMENTS

| CN | 1453200 A | 11/2003 |
| CN | 1924416 A | 3/2007 |

(Continued)

OTHER PUBLICATIONS

European Extended Search Report from European Patent Application No. 20157820.0, dated Jun. 16, 2020 (all pages enclosed).

(Continued)

*Primary Examiner* — Abiy Teka
(74) *Attorney, Agent, or Firm* — Nelson Mullins Riley & Scarborough LLP

(57) ABSTRACT

A control unit for pneumatic actuation of a cylinder, in particular an active creel of a textile-processing machine or a cabling machine, having a compressed air inlet for connecting a compressed air supply, a working air outlet for operating the cylinder, which acts at least on one side, a valve unit arranged between the compressed air inlet and the working air outlet, and an operating element for opening the valve unit to trigger a lifting movement of the cylinder. In order to provide a control unit for pneumatic actuation of an active creel, the actuation of the creel being particularly simple by the control unit, so that an operator can use the creel more easily, quickly and safely, and in addition the creel is protected from damage by incorrect operation, the control unit for achieving a self-retaining valve function, in which the lifting movement of the cylinder is fully executed with a single and/or brief actuation of the operating element, and for the control unit is connected to an end position sensor of the cylinder such that, when the end position sensor is activated, the valve unit is closed and/or the cylinder connected to the working air outlet is automatically depressurized when or after an end position is reached.

13 Claims, 4 Drawing Sheets

(56) References Cited

U.S. PATENT DOCUMENTS

| | | | |
|---|---|---|---|
| 4,463,656 A * | 8/1984 | Mattsson | ................ F15B 11/06 91/20 |
| 7,637,281 B2 | 12/2009 | Rapke et al. | |
| 2003/0201354 A1 | 10/2003 | Osterloh et al. | |
| 2003/0201355 A1 | 10/2003 | Lohmann et al. | |
| 2007/0044857 A1 | 3/2007 | Rapke et al. | |
| 2010/0276171 A1 | 11/2010 | Hirling et al. | |

FOREIGN PATENT DOCUMENTS

| | | | |
|---|---|---|---|
| DE | 3200531 A1 | 9/1982 | |
| EP | 1255049 A2 | 11/2002 | |
| EP | 1357209 A2 | 10/2003 | |
| FR | 2260726 A1 | 9/1975 | |
| FR | 2794136 A1 | 12/2000 | |
| GB | 2091345 A * | 7/1982 | ............ F15B 11/048 |
| WO | 2011/010274 A1 | 1/2011 | |

OTHER PUBLICATIONS

Examination Report of European Patent Application No. 20157820.0, dated Feb. 4, 2022, all enclosed pages cited.
Office Action from Indian Patent Application No. 202024006924, dated Jul. 3, 2021, all enclosed pages cited.
Office Action from Chinese Patent Application No. 202010097725.2, dated Oct. 29, 2021, all enclosed pages cited.

* cited by examiner

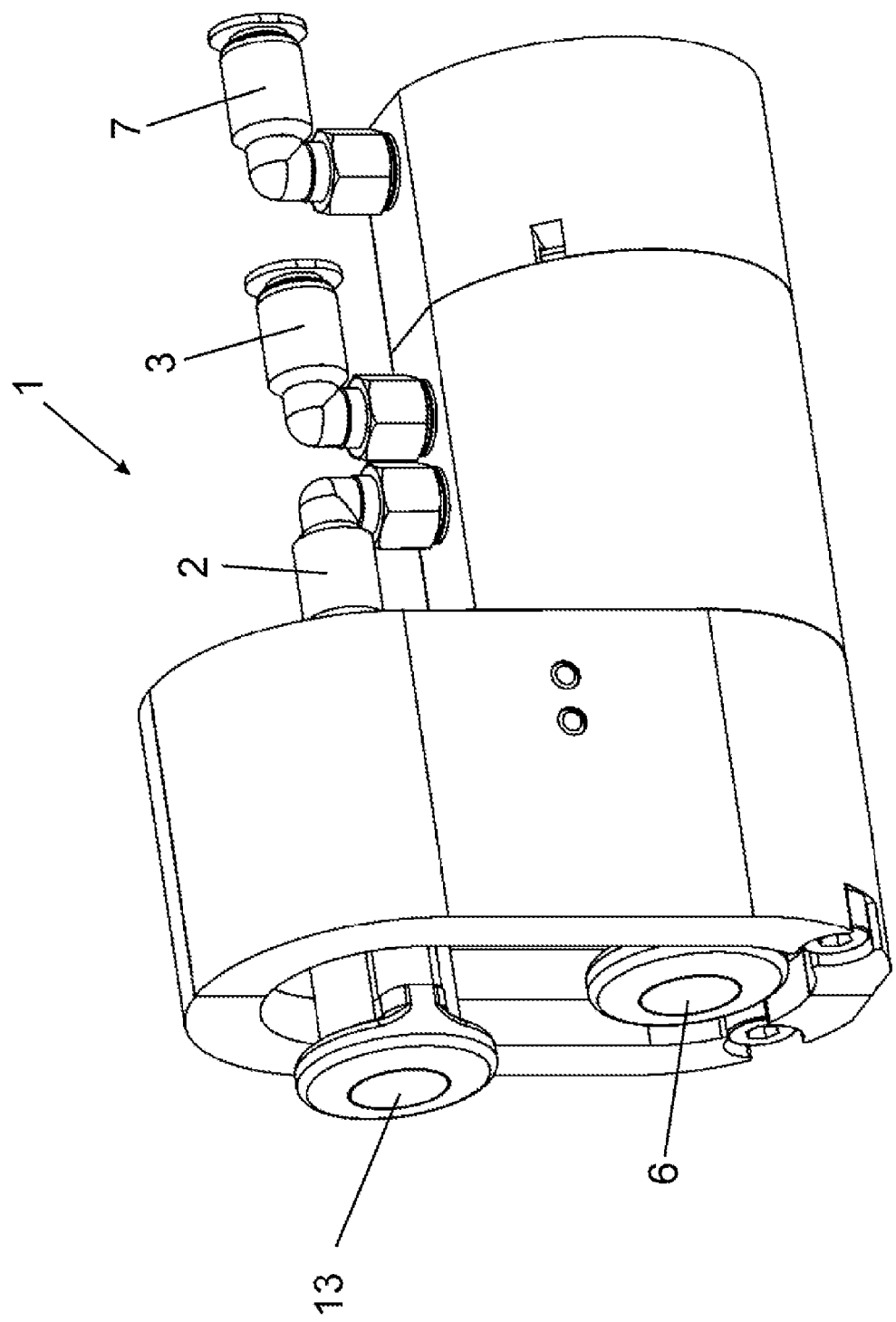

CONTROL UNIT FOR THE PNEUMATIC ACTUATION OF AN ACTIVE CREEL

CROSS-REFERENCE TO RELATED APPLICATIONS

This application claims priority from German National Patent Application No. 10 2019 104 283.6, filed Feb. 20, 2019, entitled "Steuereinheit zur pneumatischen Ansteuerung eines aktiven Spulengatters", the entire contents of which are incorporated herein by reference.

FIELD OF THE INVENTION

The present invention relates to a control unit for pneumatic actuation of a cylinder, in particular an active creel of a textile-processing machine or a cabling machine, having a compressed air inlet for connecting a compressed air supply, a working air outlet for operating the cylinder, which acts at least on one side, a valve unit arranged between the compressed air inlet and the working air outlet, and an operating element for opening the valve unit to trigger a lifting movement of the cylinder, in particular of the creel. Furthermore, the present invention relates to a creel for a textile-processing machine, in particular for a cabling machine. Finally, the present invention relates to a method for active pneumatic movement, in particular lifting of a creel of a textile-processing machine, in particular a cabling machine.

BACKGROUND OF THE INVENTION

Creels of various configurations are known from the prior art. The creels are regularly used in textile-processing machines, such as spinning or twisting machines, in particular cabling machines, in order to hold at least one, preferably several, feed packages ready. For this purpose, the creels are often positioned above or behind one or more workstations of a cabling machine. In order to obtain better access to the creel when changing the feed package, the creels can often be swivelled into an operator-friendly position by means of a swivel arm. The creel must then be returned to an upper, difficult-to-access position of use in order to save space and improve accessibility to the rest of the textile-processing machine. This is commonly done pneumatically, particularly by means of a pneumatic cylinder, although purely mechanical and/or manual as well as hydraulic solutions have also been disclosed.

The state-of-the-art, pneumatically swivelling creels are actuated via a button on a control valve, in which case an operator must keep the button pressed for the entire time of an upward swivelling movement until the creel has arrived in a stable end position. Normally, these pneumatically swivelling creels have a pneumatic cylinder acting on one side, meaning that the downward swivelling movement of the creel takes place manually. This compresses the air in the pneumatic cylinder or in its piston chamber, so that the operator can release the creel from a swivel angle of the creel of about 20°-30° (depending on the package load) and does not have to guide it further. The further downward movement is then carried out automatically against a damping pressure cushion until it reaches a lower end position.

European Patent Publication EP 1 357 209 A2 already discloses a creel for textile machines which is arranged by means of an articulated quadrilateral on one of the machine frames of the textile machine, the fixed member of the holder forming the quadrilateral being pivotably mounted and pivoting from a lower loading position into an upper operating position by means of a pneumatic cylinder articulated on the one hand on the holder and on the other hand on one of the movable quadrilateral members, in which case a pneumatic cylinder is provided which can be acted upon at both sides with compressed air, which is used to pivot the creel from the operating position into the loading position of the pneumatic cylinders.

The problem addressed by the present invention is that of providing a control unit for pneumatic actuation of a cylinder, a creel for a textile-processing machine and a method for active pneumatic movement of a cylinder, in which the creel has a particularly simple actuation by means of the control unit so that an operator can use the creel more easily, quickly and safely and also the creel is protected from damage due to incorrect operation.

SUMMARY OF THE INVENTION

According to the present invention, the problem is solved by a control unit for pneumatic actuation of a cylinder, in particular an active creel of a textile-processing machine or a cabling machine, with a compressed air inlet for connecting a compressed air supply, a working air outlet for operating the cylinder acting at least on one side, a valve unit arranged between the compressed air inlet and the working air outlet, and an operating element for opening the valve unit to trigger a lifting movement of the cylinder, characterised in that the control unit for achieving a self-retaining valve function, in which the lifting movement of the cylinder is fully executed with a single and/or brief actuation of the operating element, and in that the control unit is connected to an end position sensor of the cylinder in such a way that, when the end position sensor is activated, the valve unit is closed and/or the cylinder connected to the working air outlet is automatically depressurized when or after an end position is reached.

According to the present invention, the problem is solved by a creel for a textile-processing machine, in particular for a cabling machine, with a control unit as described above, and a cylinder acting at least on one side for carrying out a lifting movement of the creel on the textile-processing machine, wherein the control unit and/or the cylinder are formed in such a way that the cylinder is automatically depressurized when or after an end position of the lifting movement is reached.

According to the present invention, the problem is solved by a for active pneumatic movement of a cylinder, in particular of a creel of a textile-processing machine or of a cabling machine. The method comprises actuating an operating element of a control unit, in which case a valve unit of the control unit arranged between a compressed air inlet and a working air outlet is opened at least as long as a movement of the cylinder is fully executed out by a cylinder connected to the working air outlet and acting at least on one side, and monitoring of the movement of the cylinder by the control unit, the valve unit being closed at a sensor air inlet of the control unit when the pressure rises and/or a threshold pressure value is exceeded and/or the cylinder connected to the working air outlet is automatically depressurized when or after an end position is reached.

Advantageous further developments of the invention are described herein.

The control unit according to the present invention for pneumatic actuation of a cylinder, in particular an active creel of a textile-processing machine or a cabling machine, having a compressed air inlet for connecting a compressed air supply to the control device, a working air outlet for operating the cylinder which acts at least on one side, a valve unit arranged or acting between the compressed air inlet and the working air outlet, and an operating element for opening the valve unit to trigger a lifting movement of the cylinder, in particular a creel, by the cylinder connected to the working air outlet. The control unit is designed in such a way that a self-retaining valve function is achieved, in which the lifting movement of the cylinder is fully executed with a single and/or brief actuation of the operating element. Furthermore, there is provision for the control unit to be connected to an end position sensor of the cylinder in such a way that, when the end position sensor is activated, the valve unit is closed and/or the cylinder connected to the working air outlet is automatically depressurized when or after an end position is reached.

The creel according to the present invention for a textile-processing machine, in particular for a cabling machine, has a control unit according to the present invention and a cylinder acting at least on one side for carrying out a lifting movement of the creel on the textile-processing machine, in which case the control unit and/or the cylinder are designed in such a way that the cylinder is automatically depressurized when or after an end position of the lifting movement is reached.

The method according to the present invention for the active pneumatic movement, in particular lifting, of a cylinder, in particular of a creel of a textile-processing machine or a cabling machine, comprises the method steps, firstly, of actuating an operating element of a control unit, in particular a control unit according to the present invention, as a result of which a valve unit of the control unit arranged between a compressed air inlet and a working air outlet is opened at least until a movement of the cylinder, in particular a lifting movement of the creel, is fully executed by a cylinder which is connected to the working air outlet and acts at least on one side. The following method step is then to monitor the movement of the cylinder by the control unit, the valve unit being closed at a sensor air inlet of the control unit when the pressure rises and/or a threshold pressure value is exceeded and/or the cylinder connected to the working air outlet is automatically depressurized when or after an end position is reached.

Within the scope of the present invention, the inventors have achieved a new special control unit with a new valve unit as the control valve for a new special cylinder. The invention enables particularly simple movement control, which is performed purely pneumatically. Furthermore, due to a binary operating principle—the operator only has to press the operating element briefly to trigger the lifting movement—the risk of operating errors, in particular due to incomplete execution of the lifting movement, is considerably reduced or even eliminated. The fact that the operator does not have to keep the operating element pressed during the entire movement time during the lifting movement also leads to faster operability and correspondingly shorter handling time as well as to increased operational safety, since the operator can stand at a safe distance from the swivelling creel after actuating the operating element. In addition, the fact that the cylinder is depressurized when it reaches the end position avoids a permanent pressure load, which allows a more cost-effective cylinder to be used, and also allows wear and tear to be reduced and thus significantly shorter downtimes due to defects or maintenance. Finally, the control unit according to the present invention enables a much more compact design.

The control unit can basically be any component or any group of components, in which case the control unit is always intended for the pneumatic control of at least one cylinder. The control unit is preferably a compact or integral unit, the components of which are preferably arranged completely on and/or inside a housing. The valve unit is, in particular, preferably located completely inside the housing. The operating element, of which there is at least one, in particular all operating elements, and/or the compressed air inlet and/or the working air inlet and/or the sensor air inlet are preferably arranged directly on the housing. In principle, the control unit can also have other functions in addition to the pneumatic control of one or more cylinders, although the control unit preferably does not perform any other functions. In addition, the operating element can also be basically configured outside of and/or not part of the control unit, in particular as a remote control.

A textile-processing machine in the sense of the present invention can in principle be any machine which processes a textile and in particular produces or processes either a thread, a yarn, a fibre strand or the like. Threads, yarns or the like are preferentially presented for further processing on the textile machine and arranged, in particular, on a creel. The textile-processing machine is, in particular, preferably a spinning or twisting machine, while a cabling machine is particularly preferred.

A creel is a device and in particular a part of a textile machine, by which at least one package, in particular a feed package, can be mounted and preferably also fed to the textile machine. For this purpose, the creel can preferably swivel between an operator-friendly position for loading the creel with packages and a position of use, in which in a particularly preferred embodiment the position of use is located spatially above the operator-friendly position. Preferably, at least the lifting movement into the position of use is effected by a working fluid and preferably pneumatically or alternatively also hydraulically, in particular by at least one cylinder. A creel which can be pivoted pneumatically or by a motor in at least one direction is referred to as an active creel. In a particularly preferred embodiment, the swivelling and in a quite particularly preferred embodiment, the entire operation of the creel is exclusively performed pneumatically and, if necessary, manually or manually by an operator in addition. The creel is also preferably formed as a single integral unit with a special cylinder configuration. The complete execution of a lifting movement of the creel is understood to be the process in which the valve unit is held open permanently or until an end position of the creel and/or the cylinder is reached, in which after the complete execution of the lifting movement a pneumatic piston of the cylinder is particularly preferred to be completely extended.

The compressed air inlet is provided in accordance with the present invention on the control unit in order to connect the control unit to a working fluid supply, in particular a compressed air supply. The supply of compressed air to the control unit enables a pneumatic drive of at least one cylinder of the creel to carry out a lifting movement. Preferably, all the compressed air required to operate the cylinder, in particular all cylinders, of the creel, flows completely through the control unit. In order to allow a particularly simple connection of the compressed air supply, the compressed air inlet and/or the working air inlet and/or the sensor air inlet are preferably a standardised connection, in which case all inlets and outlets of the control unit are preferably identical. The compressed air to be supplied to the compressed air inlet is preferably compressed air with a pressure of approx. 6 bar. In principle, however, any gas or gas mixture can be used with any pressure in the control unit, as long as it is high enough to operate the cylinder.

The working air outlet is designed in accordance with the present invention to enable a working fluid, in particular compressed air, to be directed from the control unit to the cylinder. Preferably, the working air outlet via the valve unit can be directly connected to the compressed air inlet. The working air outlet is preferably used to connect a compressed air line. Furthermore, the maximum pressure at the working air inlet is preferably equal to the pressure of the compressed air supplied through the compressed air inlet.

The valve unit is basically a component or assembly of the control unit which can establish and disconnect at least one connection between the compressed air inlet and the working pressure outlet or open and close a passage between the compressed air inlet and the working pressure outlet. Pressure regulation by the valve unit does not have to be provided. However, in the case of advantageous further embodiment of the valve unit, it is conceivable for the valve unit to be provided with several pressure stages or for the valve unit even to be infinitely variably controllable. The control unit is preferably formed in such a way that the valve unit is in the closed position in an initial position of the control unit and the control unit, in particular preferably the operating element and/or a slider of the control unit, is pneumatically or mechanically preloaded towards the closed position of the valve unit, in particular by a spring.

The cylinder acting at least on one side can be any pneumatically or hydraulically operable cylinder or, alternatively, any other linear-acting actuator, in particular one which can be extended in at least one spatial direction. Preferably, the cylinder is only actively driven in the extending direction or can be supplied with compressed air. The cylinder is preferably a lifting cylinder and has particularly preferably a piston displaceable in one direction by compressed air with a piston rod arranged on it, in which case the piston rod can carry out work in relation to the cylinder housing. In the case of a cylinder acting on one side, there is preferably a pressure chamber on one side of the piston, which is particularly preferably essentially closed in each position of the piston, with the exception of one or more throttle openings if necessary. Furthermore, there is preferably at least one ventilation hole on the side of the cylinder opposite the pressure chamber and in particular in the region of the outlet of the displaceable piston rod from the cylinder, so that no compression of the air takes place on the opposite side of the piston during displacement of the piston due to the compressed air flowing into the pressure chamber. It is particularly preferred for there to be at least two ventilation holes arranged opposite one another at one end of the cylinder in relation to the piston rod or the central longitudinal axis of the cylinder.

The operating element can initially be any component or functional unit that has at least two positions or states. The operating element is preferably a button and especially preferably a pushbutton. The operating element can also be actuated by pressing. In addition, the control unit can also have a second or even further operating elements, in which case preferably at least a first and a second operating element and especially preferably all operating elements are identical to one another.

A self-retaining valve function is understood to mean that the valve unit has at least one position in which it remains in this position after a transfer until it is moved out of this position again due to an external or externally controlled force action. This is particularly preferred in the opened position of the valve unit. Another preferred feature of the self-retaining valve function is that the valve unit can be moved from the closed to the open position by briefly actuating the operating element and then remains there—even without further actuation of the operating element—until the valve unit is moved back to the closed position by a further, targeted application of force. Thus, the control unit is designed in such a way that a self-retaining valve function is achieved, in which the valve unit remains in the open position when the operating element is actuated only once and/or for a short time, so that the lifting movement of the creel is carried out completely.

When the pressure rises and/or a threshold pressure value at the sensor air inlet is exceeded, in particular when an end position of a connected cylinder is reached and more precisely when an end position of the piston of a connected cylinder is reached, the valve unit is closed, in which case in a particularly preferred embodiment the gas pressure at the sensor air inlet of the control unit moves the valve unit directly from the open to the closed position. The threshold pressure value at the sensor air inlet is preferably determined in relation to the pressure at the working air outlet, in which case the threshold pressure value is preferably more than 50%, especially preferably between 50% and 200%, even more especially preferably between 75% and 150% and particularly preferably between 80% and 120% of the pressure at the working air outlet. In particular in connection with a throttle opening penetrating the piston of the cylinder, such a limit value definition makes sense. In principle, however, the threshold pressure value can be adapted at will to the respective requirements and in particular to the mechanical structure of the creel.

According to the invention, the cylinder connected to the working air pressure outlet is automatically depressurized when an end position is reached, in which case the automatic depressurisation of the cylinder can be achieved by at least one ventilation hole in the cylinder and/or by a position switching valve or in any other manner, in which case it is preferable for the position switching valve or the valve unit of the control unit to actively vent the cylinder. A position switching valve can, for example, be switched by a mechanical contact to detect the end position. The position switching valve and/or the mechanical contact, in particular a position contact, can be fixed to the frame and/or arranged on the creel and/or on or in the cylinder. In addition, a pneumatic sensor range within the cylinder is also conceivable in order to detect the end position.

A operating element actuation is any operation in which the operating element is moved from one defined status by an operator to another defined status. The actuation can be permanent, one-time and/or short-time, with both types of actuation preferably leading to the same status of the control unit.

Monitoring the lifting movement of the cylinder by the control unit initially only means that a specific status of the cylinder, in particular reaching the end position, is determined. Continuous monitoring of the position of the piston in the cylinder is not necessary for this, but can also be carried out additionally. In addition, monitoring of the lifting movement can also include temporary or continuous monitoring of the pressure at the working air outlet and/or at the sensor air inlet, for example to detect overload statuses of the cylinder.

An embodiment of the control unit according to the present invention is particularly preferred in which there is a sensor air inlet for connecting an end position sensor, with the valve unit being closed in the event of a pressure increase and/or a threshold pressure value being exceeded and/or a sensor pressure not being present at the sensor air inlet and/or the cylinder connected to the working air outlet is automatically depressurized when or after an end position is reached, as a result of which the control unit and the associated end position sensor can be operated purely pneumatically. The end position sensor can be any mechanically, electronically, pneumatically and/or hydraulically acting or operated sensor. The sensor preferably transmits signals pneumatically and, particularly preferably, the sensor is operated completely pneumatically.

According to an advantageous further embodiment of the control unit according to the invention, the control unit is formed in such a way that the operating element is deactivated, in particular automatically, after only a single and/or brief actuation and is preferably reactivated in the event of a pressure rise at the sensor air inlet and/or if a threshold pressure value is exceeded and/or if a sensor pressure is not present at the sensor air inlet, as a result of which incorrect operation of the operating element is ruled out in a simple way. Deactivation initially only means that the operating element reaches or is brought into an operating status in which a renewed actuation is not possible and/or does not lead to any further effect, in particular no change in the cylinder and/or the lifting movement of the creel. Accordingly, activation means that the operating element reaches or is brought into an operating status in which a renewed actuation is possible and/or leads to an effect, in particular the opening of the valve unit.

According to a preferred embodiment of the control unit according to the present invention, the valve unit has a slider which, by actuation of the operating element inside the control unit, can be displaced between an open and closed position, in particular from a closed position into an open position of the valve unit, the slider in a particularly preferred embodiment having a duct or aperture which only connects the compressed air inlet with the working air outlet in the open position, thus ensuring safe and reliable operation of the valve unit in a simple manner and preventing incorrect operation in the sense of setting undesired valve statuses. The duct can basically be designed in any way as long as the duct connects the compressed air inlet with the working air outlet in the open position of the valve unit. The duct preferably connects the compressed air inlet exclusively with the working air outlet or runs only between the compressed air inlet and the working air outlet. The duct can also run at least in sections inside the slider or be formed exclusively on the surface of the slider, in particular as a straight groove or recess. Furthermore, the duct preferably has an opening corresponding to the position of the compressed air inlet and/or the working air outlet on the housing of the control unit or a corresponding extension in order to connect the compressed air inlet with the working air outlet in the open position of the valve unit.

The slider is preferably arranged completely inside a housing of the control unit. The slider is also preferably guided in the form of a cylinder and/or along the outer surface or along its direction of displacement on the housing of the control unit and is particularly secured against rotation. The slider can also be moved linearly using the operating element. For this purpose, the operating element or a movable part of the operating element is preferably located directly on the slider. The operating direction of the operating element preferably continues to correspond to the direction in which the slider can be moved, and the operating element and slider are particularly preferably arranged coaxially, even more particularly preferably along a common axis.

In particular, it is advantageous for the control unit to be configured according to the present invention, in which a magnet is arranged on the slider and/or the slider opposite to the housing of the control unit in such a way that the slider is held in the open position of the valve unit by the force of the magnet in the open position, which arrangement forms a control unit in a simple manner with a special magnetic holding function of the valve unit resulting in a self-retaining valve function so that even if the operating element is actuated only briefly, the valve unit remains reliably in the open position. In the open position of the valve unit or the corresponding position of the slider, the magnet is preferably arranged close enough to the opposite, magnetically interacting surface of the slider or the housing that a sufficiently strong magnetic interaction takes place, while in the closed position of the valve unit or the corresponding position of the slider, the magnetic interaction is at least so weak that the slider is not pulled into the open position. Furthermore, the magnet is preferably a permanent magnet, although a design as an electromagnet is also conceivable. Finally, it is preferred for a metal plate made of a magnetically attractable material, in particular iron, to be arranged opposite the magnet in the control unit, particularly on the housing of the control unit. As an alternative to the magnet, another element can be provided to hold the slider in position, such as a suction cup or a Velcro connection.

According to an advantageous further embodiment of the control unit according to the present invention, the sensor air inlet is arranged in such a way that a pressure applied to it counteracts the force of the magnet, in which case preferably the sensor air inlet is connected to a valve chamber which is arranged between the housing of the control unit, in particular a metal plate arranged on the control unit, and the magnet, in which case the valve unit can be moved in a simple manner directly from the open position to the closed position by an increasing pressure at the sensor air inlet. An increasing pressure at the sensor air inlet leads in a simple way to a sudden change in position of the valve unit from the open position to the closed position as soon as the pressure exceeds the holding force of the magnet. The valve chamber is preferably arranged in such a way that a pressure increase leads to a direct displacement of the slider into the closed position and/or the gas introduced through the sensor air inlet acts directly on the slider.

In a preferred configuration of the control unit according to the invention, a spring, in particular a spiral spring, is arranged in such a way that the operating element is pretensioned to the position of a closed position of the valve unit. Furthermore, the spring force preferably counteracts the force of the magnet and in particular the magnetic direction of action, so that after overcoming the magnetic force by a pressure applied to the sensor air inlet, the valve unit, in particular the slider, and/or the operating element are moved completely and reliably into the starting position or the closed position. This movement corresponds to an automatic reactivation or a reset to the initial position of the operating element.

A preferred further embodiment of the control unit according to the present invention is characterised by a second operating element which is only activated or operable if the first operating element has been actuated and/or by which the position and/or function of the first operating element can be immediately reversed, in which case a further control function and, in particular, a cancellation of the function triggered by the first operating element is possible in a simple and intuitive manner for the operator. By the second operating element, in particular an actuated first operating element, the actuation of which has opened the valve unit and accordingly triggered a lifting movement of the creel, can be returned to the initial position in a simple manner, in which case the valve unit can be brought immediately into a closed position independently of the position of the creel along the lifting movement and in particular before reaching the end position. In addition, the first operating element can be reset to its initial position independently of the pressure at the sensor air inlet. Accordingly, the second operating element immediately interrupts the process cycle after the first operating element has been actuated, so that the valve function can be stopped. The first and second operating elements are preferably connected to one another by a lever and especially by a rocker, so that actuation of one operating element from a first to a second position automatically results in movement of the other operating element from the second to the first position. Accordingly, the two operating elements are always in different statuses. In particular, one operating element is always depressed and/or deactivated when the other operating element is in a depressible extended position and/or activated accordingly.

Alternatively, a version is also conceivable in which only one operating element is provided which is designed in such a way that it can be reset manually after actuation, in particular pulled out again from a pressed position. The operating element is preferably designed as a mushroom-head switch or button. Furthermore, the running process cycle is preferably terminated immediately if the first operating element is pulled out or manually reset.

In a preferred embodiment of the creel according to the present invention, the cylinder has at one end, in particular in the region of a piston rod outlet opening, a sensor range with a sensor air outlet, in particular as an end position sensor, which is connected to the sensor air inlet of the control unit for closing the valve unit. The sensor range is preferably formed in such a way that shortly before the end position of the piston is reached in the cylinder, there is a pressure increase in the sensor range, in which case the end position can be determined pneumatically in a particularly simple way. The sensor range acts as an end stop sensor, especially as a pneumatic end stop sensor. A gas that can be applied to the sensor air inlet of the control unit and then brings the valve unit directly into the closed position is particularly advantageous at the same time. The sensor air outlet of the cylinder can preferably be connected directly to the sensor air inlet of the control unit or can be connected directly to it for the intended use of the control unit.

According to an advantageous further embodiment of the creel according to the present invention, the cylinder has a cross-sectionally reduced area inside at one end, especially in the sensor range. Furthermore, a sensor piston with a diameter corresponding to the diameter of the cross-sectionally reduced area is arranged on the piston on the side facing the cross-sectionally reduced area, which enters the cross-sectionally reduced area shortly before the end position of the piston is reached in the cylinder, so that the pressure in the sensor range and thus at the sensor air outlet increases. Such an increasing pressure makes it possible to detect the end position by a particularly simple construction and in a particularly failsafe manner. Preferably, the inside of the cylinder and/or the cross-sectionally reduced area have a cylindrical shape and/or a constant diameter over the entire length. In addition, the piston has a preferred diameter adapted to the inside of the cylinder and has a cylindrical shape adapted to the inside of the cylinder. In a preferable embodiment, the ventilation hole, of which there is at least one, and particularly preferably all ventilation holes, is/are outside the cross-sectionally reduced area and especially in an area adjacent to the cross-sectionally reduced area.

The interior of the cross-sectionally reduced area preferably forms a smaller piston chamber within which the sensor piston can be inserted, but not the piston with the larger diameter corresponding to the interior of the cylinder. Furthermore, the cross-sectionally reduced area is preferably located at the end of the cylinder at which the piston rod emerges from the cylinder, and is formed particularly preferably in or as part of the piston cover. The diameter of the cross-sectionally reduced area is preferably at least 5%, particularly preferably between 10% and 50% and even more particularly preferably between 15% and 30% smaller than the diameter of the remaining interior of the cylinder, particularly the area within which the piston is displaceable. Finally, the sensor piston has a length along the central longitudinal axis of the piston rod which preferably corresponds to between 10% and 100%, particularly preferably between 20% and 80% and even more particularly preferably at least 50% of the length of the sensor range or of the cross-sectionally reduced area in this direction.

In the case of a possible further embodiment of the creel according to the present invention, at least one throttle opening penetrating the piston is provided in the piston in order to increase the pressure build-up in the sensor range when the end position is reached by the working air, in which case the end position can be reliably detected independently of the positioning speed of the piston in the cylinder. In a preferred embodiment, the throttle opening connects the pressure chamber to which the working air is introduced, directly with the side opposite the piston inside the cylinder. Furthermore, the diameter of the throttle opening is preferably chosen so small that a sufficient working pressure in the pressure chamber can be built up by the working air from the working air outlet of the control unit in order to be able to actuate the cylinder with a sufficient force of the piston rod. However, the preferred diameter is still so large that working air can flow into the sensor range sufficiently quickly when the end position is reached, in order to achieve fast and reliable switching of the control unit.

According to a preferred embodiment of the creel according to the present invention, the creel can be fixed in an uppermost position attainable by the lifting movement of the cylinder and for this purpose is in particular moved beyond a dead centre or is in particular releasably fixed again by a locking device, so that the cylinder, in particular the pressure chamber of the cylinder, can remain pressureless in the end position and together with the closing of the valve unit, without the position of the creel changing. A spring element can be arranged on the creel in such a way that the creel is held in position by the spring force.

A preferred embodiment of the method according to the present invention for the active pneumatic movement of a creel is for the operating element to be automatically returned to its initial position when or after the valve unit is closed, in particular due to the increasing pressure at the sensor air inlet, and thus released for the next actuation, in which case particularly simple operability is achieved and incorrect operation is prevented.

According to an advantageous further embodiment of the method according to the present invention for the active pneumatic movement of a creel, the sensor air inlet and/or the working air outlet of the valve unit are released for venting when the valve unit is closed and, in particular, when a slider of the valve unit is displaced as a result. As a result of this, the cylinder and in particular a pressure chamber connected to the working air outlet on one side of the piston and/or the other part of the cylinder connected to the sensor air inlet of the control unit on the other side of the piston are vented in a particularly simple way and thus depressurized. Alternatively, a separate and/or interposed vent valve between the cylinder and valve unit or control unit can be provided to allow venting.

BRIEF DESCRIPTION OF THE DRAWINGS

An embodiment example of a control unit, further parts of a creel as well as a method for the active pneumatic lifting of a creel are explained in more detail below with reference to the drawings. In the drawings:

FIG. 1a illustrates a perspective view of a control unit,

DESCRIPTION OF THE PREFERRED EMBODIMENTS

Figure 1B:
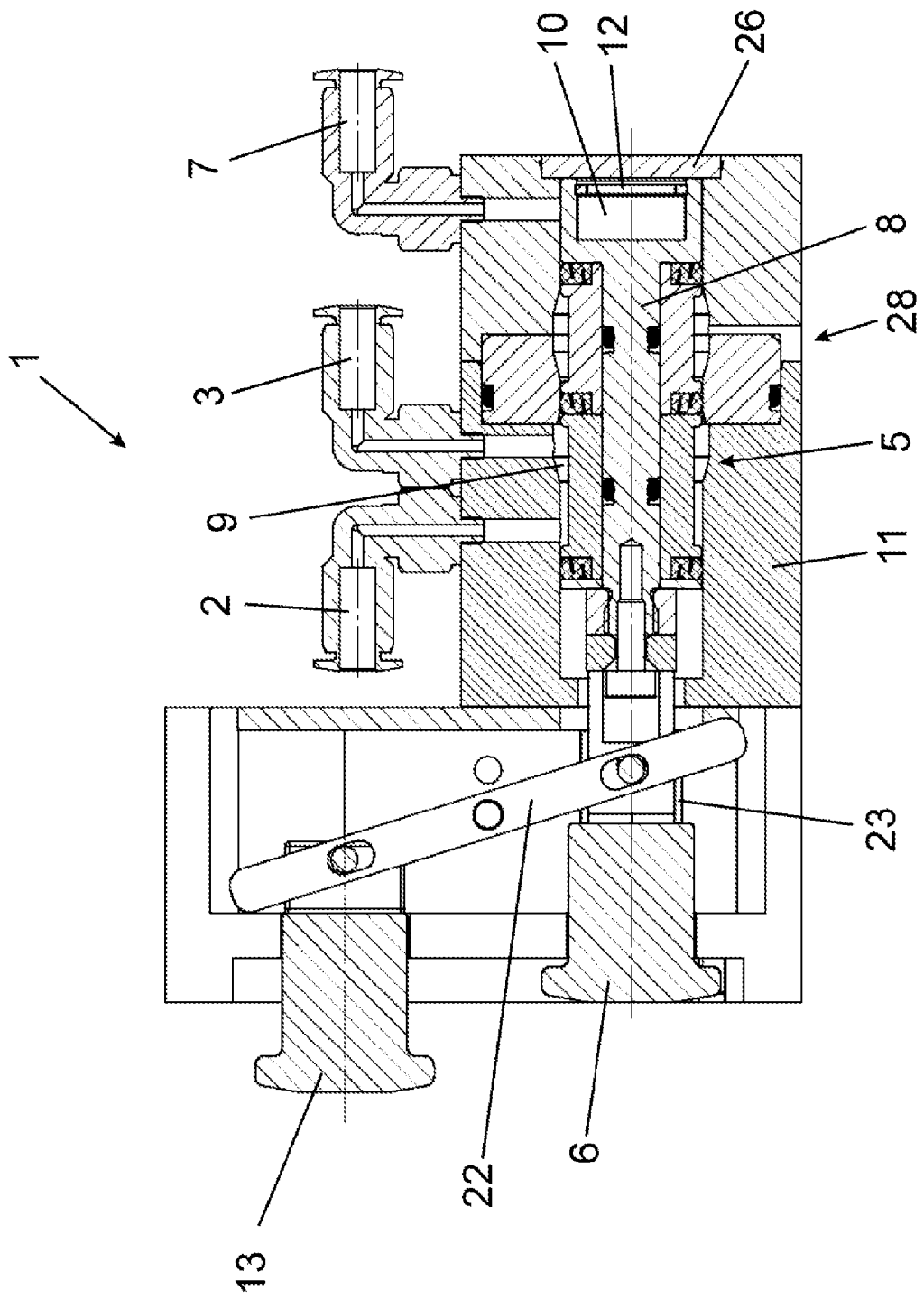
FIG. 1b illustrates a perspective sectional view of the control unit shown in FIG. 1a, FIG. 2 illustrates a perspective cross-sectional view of a cylinder.

In a version shown in FIGS. 1a and 1b of a control unit 1 formed as an integral unit for the pneumatic control of an active creel of a textile-processing cabling machine, two operating elements 6, 13 are arranged on one side on the outside of a housing 11 and three connections are arranged on another side. The first connection is a compressed air inlet 2 to which a compressed air hose for supplying compressed air with 6 bar pressure to control unit 1 and subsequently to a pneumatic cylinder 4 of the creel can be arranged. A working air outlet 3 is arranged directly next to it as a second connection, which is intended to direct compressed air as working medium to at least one pneumatic cylinder 4. In addition to these two connections, the third connection on the housing 11 is a sensor air inlet 7 on the control unit 1, to which a compressed air line coming from a pneumatic sensor or a sensor range 15 of the pneumatic cylinder 4 can be connected.

Inside the housing 11 of the control unit 1, a valve unit 5 is arranged which is essentially formed by a slider 8, which is also cylindrical and can be displaced within a cylindrical section of the housing 11. The slider 8 can be moved by the operating elements 6, 13 and can be moved between a closed and an open position of the valve unit 5. FIG. 1 shows control unit 1 with valve unit 5 in the open position.

The slider 8 has a duct 9 on its surface which, in the open position of the valve unit 5, connects the compressed air inlet 2 with the working air outlet 3. If slider 8 is moved to the closed position of valve unit 5, the duct 9 is only in the area of compressed air inlet 2, but no longer in the area of working air outlet 3, so that compressed air can no longer flow from compressed air inlet 2 through valve unit 5 into working air outlet 3 and from there to a pneumatic cylinder 4.

The first operating element 6 is directly connected to the slider 8 of the valve unit 5, so that pressing in the operating element 6 moves the slider 8 to the open position of the valve unit 5. Accordingly, the first operating element 6 triggers a lifting movement of the creel due to activation of the pneumatic cylinder 4. The operating element 6 is arranged so that it can be moved along a central longitudinal axis of the slider 8.

By a fixed rocker 22, the first operating element 6 is connected to the second operating element 13 arranged above it in such a way that both operating elements 6, 13 are basically in different operating statuses. If the first operating element 6 is pressed, the second operating element 13 simultaneously returns from the pressed position to a position in which it can be actuated, while a renewed actuation of the first operating element 6, which has already been pressed in, is then no longer possible. The second operating element 13 is therefore used to reverse the function of the first operating element 6 and to immediately cancel a process triggered by the first operating element 6.

In order to ensure a reliable, self-retaining valve function, a permanent magnet 10 is arranged at one end of the slider 8 opposite the first operating element 6, and in the open position of the valve unit 5, the permanent magnet 10 is brought close enough to an iron plate 26 arranged on the housing 11 of the control unit 1, so that magnetic attraction occurs and a special magnetic retaining function therefore occurs in the open position of the valve unit 5. Therefore it is necessary to overcome the holding force of the magnet 10 to close the valve unit 5. The iron plate 26 is preferably fixed directly to the housing 11 of control unit 1 or forms part of the housing 11.

In order to move the slider 8 into the closed position of the valve unit 5 against the holding force of the magnet 10, a valve chamber 12 is arranged between the housing 11 in the area of the iron plate 26 and the surface of the slider 8 having the magnets 10, which is connected to the sensor air inlet 7. When the pressure at the sensor air inlet 7 rises and thus in the valve chamber 12, the pressure acting on the slider 8 exceeds the magnetic holding force after a certain time, minus the spring force of the spring 23, and the valve unit 5 switches abruptly from the open to the closed position.

In order to support a complete and safe switch-over from the open position to the closed position, a spiral spring 23 is arranged on the first operating element 6, which pretensions the operating element 6 against the holding force of the magnet 10 towards the closed position. For this purpose the spiral spring 23 is arranged around the first operating element 6.

Figure 2:
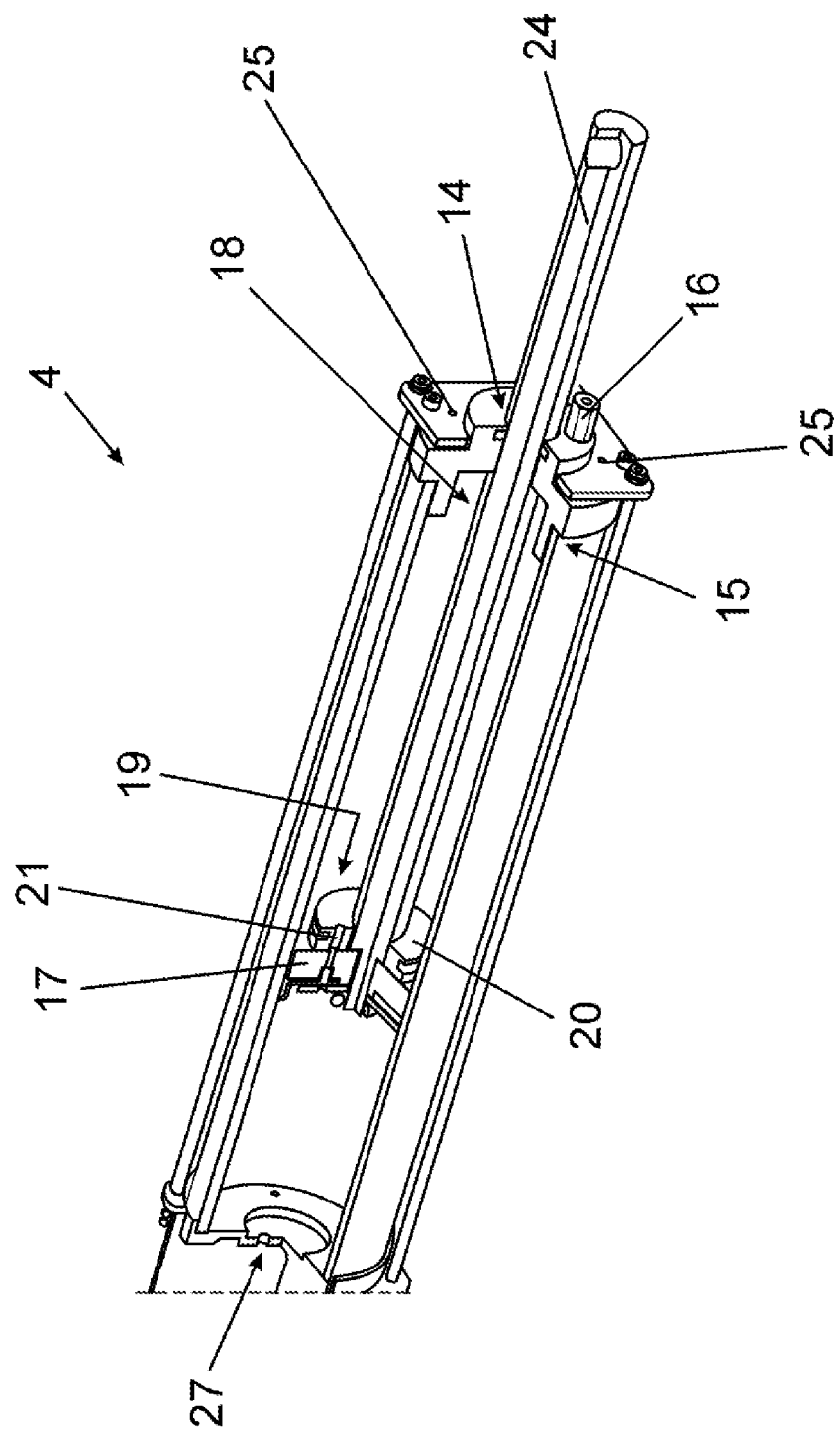

The pneumatic cylinder 4 shown in FIG. 2 has a displaceable piston 17 with a piston rod 24 emerging from one side of the pneumatic cylinder 4 out of a piston rod outlet opening 14. The pneumatic cylinder 4 is designed to act on one side only, i.e. only on the side of the piston 17 opposite the piston rod 24 can the compressed air leaving the working air outlet 3 of control unit 1 be introduced into a working air inlet 27. This compressed air then moves the piston 17 within the pneumatic cylinder 4 in such a way that the piston rod 24 emerges from the piston rod outlet opening 14 and can thus effect a lifting movement of a creel.

In order to be able to vent the opposite side inside the pneumatic cylinder 4 during this movement, two ventilation holes 25 are arranged in the area of the end having the piston rod outlet opening 14. If the piston 17 is pushed in again, for example due to the weight of a creel arranged at least indirectly on the piston rod 24, air enters the pneumatic cylinder 4 through the ventilation holes 25, so that the piston 17 moved downwards with damping. The piston 17 is vented by the cross-sectional resistance of the working air inlet 27 and/or the working air outlet 3 of control unit 1 as well as by a ventilation hole 28.

Furthermore, the pneumatic cylinder 4 has a sensor range 15 at the end having the piston rod outlet opening 14, which sensor range is formed by a cross-sectionally reduced area 18. The ventilation holes 25 are arranged in front of the cross-sectionally reduced area 18, while at the end of the cross-sectionally reduced area 18, directly next to the piston rod outlet opening 14, a sensor air outlet 16 is arranged, which is directly connected to the sensor air inlet 7 of the control unit 1.

A sensor piston 20 is arranged directly on the piston 17 on the side of the piston 17 facing away from the working air and/or the working air inlet 27, in which case the sensor piston 20 has a smaller diameter than the piston 17 and is arranged coaxially to the piston 17. The diameter of the sensor piston 20 corresponds to the diameter of the cross-sectionally reduced area 18. Towards the end of the stroke, the sensor piston 20 dips into the cross-sectionally reduced area 18 and builds up a pressure in the sensor range 15 as a result of the further lifting movement. This pressure is then transmitted through the sensor air outlet 16 to the sensor air inlet 7 of the control unit 1 and reaches the valve chamber 12 there.

Now the pressure builds up continuously in the valve chamber 12 and as soon as the area-proportional pressure force exceeds the magnetic holding force of the permanent magnet 10, the slider 8 in the valve unit 5 moves abruptly to the right in FIG. 1, i.e. into the closed position, in which case the working air outlet 3 is shut off from the compressed air inlet. At the same time, the working air outlet 3 and the sensor air inlet 7 are released for venting. Thus the pneumatic cylinder 4 is pressureless on both sides.

In addition, the movement of the slider 8 disengages the first operating element 6 and moves the second operating element 13 in the opposite direction to the first operating element 6 via the rocker 22. As a result, the creel is now in the upper position, the pneumatic cylinder 4 is completely pressureless and the control unit 1 is again in the initial position. The creel is secured against falling down by the usual measures, for example by a spring or a movement of the centre of gravity beyond the swivel axis.

In order to increase the pressure build-up in the sensor range 15 of the pneumatic cylinder 4 and, if necessary, to be able to shorten the cross-sectionally reduced area 18, a throttle opening 21 can be arranged to penetrate the piston 17 and the sensor piston 20. When the end position is reached, the working pressure can then penetrate through this throttle opening 21 through the piston 17 and act on the sensor range 15.

Figure 3:
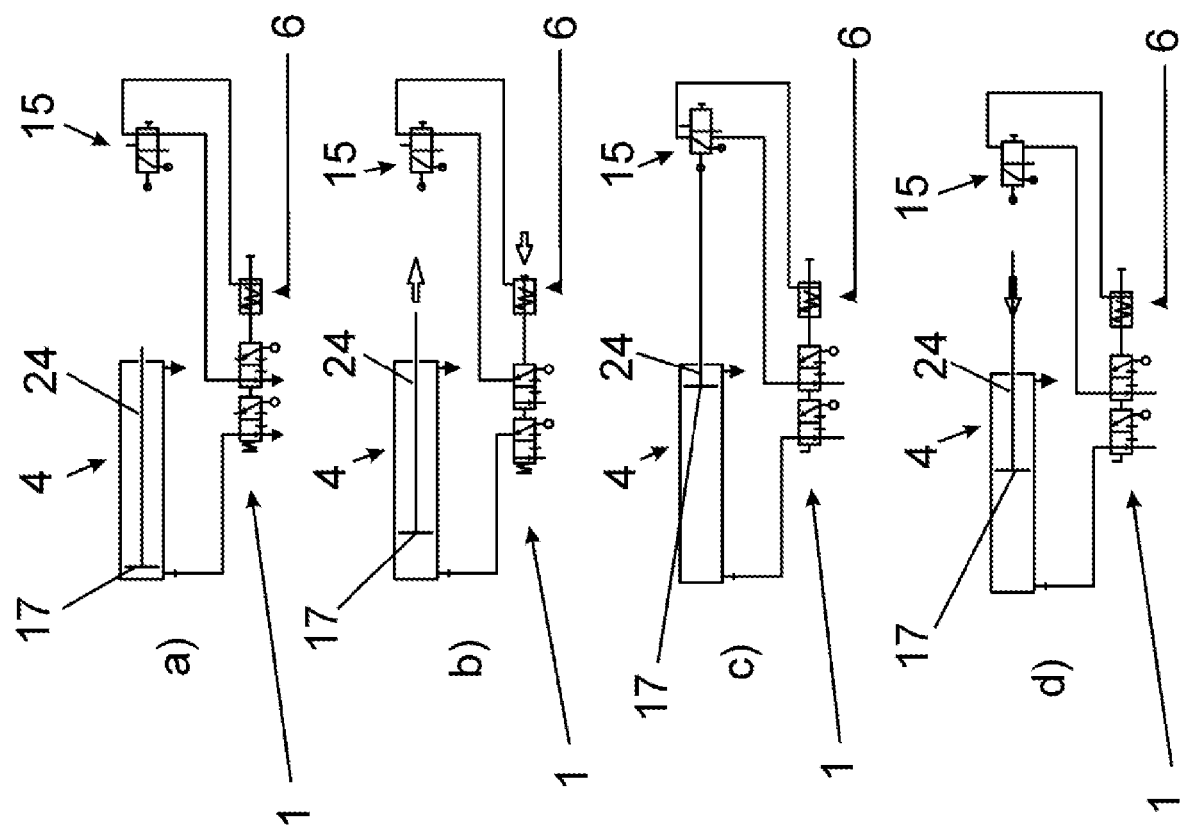
FIG. 3 illustrates a diagram illustrating the basic principle of a method for active pneumatic lifting of a creel by a control unit.

Finally, FIG. 3 schematically shows a basic principle for the implementation of a method for the operation of a creel, in which the pressureless switching is achieved by a position switching valve in the sensor range 15 outside the pneumatic cylinder 4. The position switching valve is switched by a mechanical contact when the end position is reached. FIG. 3 shows the basic principle in general, how it can be operated by different devices and also by the control unit 1 according to the present invention.

In the initial status shown in section a) of FIG. 3, a creel is in the lower loading position and is subsequently to be lifted by the pneumatic cylinder 4. The first operating element 6 is ready for operation. The position sensing valve in sensor range 15 is inactive and control unit 1 has completely vented the pneumatic cylinder 4.

If an operator now presses the first operating element 6, which corresponds to the state shown in section b) of FIG. 3, a valve unit 5 of control unit 1 is moved into an open position and compressed air flows into pneumatic cylinder 4, which thereby extends and lifts the creel to bring it into an operating position. At the same time as the first operating element 6 is pressed, the pressure circuit is also pressurized by the position switching valve in sensor range 15. Even if the operator releases the first operating element 6, it remains in the pressed position. Control unit 1 is switched back by the position sensing valve in the sensor range 15 interrupting or depressurizing the pressure circuit and releasing operating element 6, and the position sensing valve in sensor range 15 being switched ready for operation.

When the end position of the creel is reached, the active position switching valve is triggered, and at the same time the first operating element 6 is pressed out again into the starting position, as shown in section c) of FIG. 3. At the same time as the valve unit 5 is closed, the pneumatic cylinder 4 is depressurized by venting the working pressure outlet 3 and the sensor air inlet 7 of control unit 1.

Finally, the creel can be lowered manually by the operator as shown in section d) of FIG. 3, in which case this is damped by the pneumatic cylinder 4.

LIST OF REFERENCE SIGNS

1 Control unit
2 Compressed air inlet
3 Working air outlet
4 Cylinder
5 Valve unit
6 Operating element
7 Sensor air inlet
8 Slider
9 Channel of the slider
10 Magnet
11 Housing of the control unit
12 Valve chamber
13 Second operating element
14 Piston rod outlet opening
15 Sensor range
16 Sensor air outlet
17 Piston
18 Cross-sectionally reduced area
19 Side of the piston
20 Sensor piston
21 Throttle opening
22 Rocker
23 Spring
24 Piston rod
25 Ventilation hole
26 Iron plate
27 Working air inlet
28 Ventilation hole

What is claimed is:

1. A control unit for pneumatic actuation of an active creel of a textile-processing machine, the control unit comprising:
a compressed air inlet for connecting a compressed air supply,
a working air outlet for operating the cylinder acting at least on one side,
a valve unit arranged between the compressed air inlet and the working air outlet, and
an operating element for opening the valve unit to trigger a lifting movement of a cylinder,
characterised in that
the control unit for achieving a self-retaining valve function, in which the lifting movement of the cylinder is fully executed with a single and/or brief actuation of the operating element, and in that
the control unit is connected to an end position sensor of the cylinder in such a way that, when the end position sensor is activated, the valve unit is closed and/or the cylinder connected to the working air outlet is automatically depressurized when or after an end position is reached, and in that the control unit has a sensor air inlet.

2. The control unit according to claim 1, characterised in that the control unit has the sensor air inlet for connecting the end position sensor, with the valve unit being closed in an event of a pressure increase, an exceeding of a threshold pressure value, a sensor pressure not being present at the sensor air inlet, the cylinder connected to the working air outlet is automatically depressurized when or after an end position is reached, or a combination thereof.

3. The control unit according to claim 2, characterised in that the sensor air inlet is arranged such that a pressure applied to the sensor air inlet counteracts the force of a magnet, the sensor air inlet being connected to a closed valve chamber arranged between the housing of the control unit and the magnet.

4. The control unit according to claim 1, characterised in that the valve unit has a slider displaced from a closed position into an open position of the valve unit by actuation of the operating element inside the control unit, the slider having a duct which, in the open position, connects the compressed air inlet to the working air outlet.

5. The control unit according to claim 4, characterised in that a magnet is arranged on the slider or opposite the slider on a housing of the control unit such that the slider is held in the open position of the valve unit by the force of the magnet in the open position.

6. The control unit according to claim 1, characterised by a second operating element which is only activated if the first operating element has been actuated and/or by which the position and/or the function of the first operating element is immediately reversed.

7. A creel for a textile-processing machine with a control unit for pneumatic actuation of a cylinder, the control unit with:
 a compressed air inlet for connecting a compressed air supply,
 a working air outlet for operating the cylinder acting at least on one side,
 a valve unit arranged between the compressed air inlet and the working air outlet, and
 an operating element for opening the valve unit to trigger a lifting movement of the cylinder, characterised in that the control unit for achieving a self-retaining valve function, in which the lifting movement of the cylinder is fully executed with a single and/or brief actuation of the operating element, and in that the control unit is connected to an end position sensor of the cylinder in such a way that, when the end position sensor is activated, the valve unit is closed and/or the cylinder connected to the working air outlet is automatically depressurized when or after an end position is reached, and
 the cylinder for carrying out a lifting movement, wherein the control unit and/or the cylinder are formed in such a way that the cylinder is automatically depressurized when or after an end position of the lifting movement is reached,
and in that
the control unit has a sensor air inlet.

8. The creel according to claim 7, characterised in that at one end in the region of a piston rod outlet opening, the cylinder has a sensor range with a sensor air outlet as the end position sensor, which is connected to the sensor air inlet of the control unit for closing the valve unit, the sensor range being formed in such a way that shortly before the end position of a displaceable piston is reached in the cylinder there is an increase in the sensor range.

9. The creel according claim 8, characterised in that at least one throttle opening penetrating the piston is provided in the piston in order to increase the pressure build-up in the sensor range when the end position is reached by the working air.

10. The creel according to claim 7, characterised in that the cylinder has a cross-sectionally reduced area in the sensor range, and a sensor piston with a diameter corresponding to the diameter of the cross-sectionally reduced area is arranged on the piston on the side facing the cross-sectionally reduced area, which enters the cross-sectionally reduced area in the cylinder shortly before the end position of the piston is reached, so that the pressure in the sensor range and thus at a sensor air outlet increases.

11. A method for active pneumatic movement of a cylinder, the method comprising:
 actuating an operating element of a control unit, in which case a valve unit of the control unit arranged between a compressed air inlet and a working air outlet is opened at least as long as a movement of the cylinder is fully executed out by a cylinder connected to the working air outlet and acting at least on one side, and
 monitoring of the movement of the cylinder by the control unit, the valve unit being closed at a sensor air inlet of the control unit when the pressure rises and/or a threshold pressure value is exceeded and/or the cylinder connected to the working air outlet is automatically depressurized when or after an end position is reached,
 wherein the movement of the cylinder is a lifting movement of the creel.

12. The method according to claim 11, characterised in that the operating element is automatically brought back into an initial position on or after the closing of the valve unit due to the increasing pressure at the sensor air inlet and is thus released for a next actuation.

13. The method according to claim 11, characterised in that, when the valve unit is closed and a slider of the valve unit is displaced, the sensor air inlet and/or the working air outlet of the valve unit are released for venting.

* * * * *